United States Patent
Lee et al.

(10) Patent No.: US 9,961,647 B2
(45) Date of Patent: May 1, 2018

(54) DEVICE AND METHOD FOR CONTROLLING EXPOSURE OF ELECTROMAGNETIC WAVES FROM BASE STATION

(71) Applicant: ELECTRONICS AND TELECOMMUNICATIONS RESEARCH INSTITUTE, Daejeon (KR)

(72) Inventors: Ae Kyoung Lee, Daejeon (KR); Jong Hwa Kwon, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 15/176,804

(22) Filed: Jun. 8, 2016

(65) Prior Publication Data
US 2016/0374031 A1    Dec. 22, 2016

(30) Foreign Application Priority Data

Jun. 16, 2015 (KR) .................. 10-2015-0085343
Apr. 25, 2016 (KR) .................. 10-2016-0050369

(51) Int. Cl.
*H04B 7/00* (2006.01)
*H04W 52/34* (2009.01)
(Continued)

(52) U.S. Cl.
CPC ........ *H04W 52/346* (2013.01); *H04B 1/3838* (2013.01); *H04B 17/27* (2015.01); *H04B 17/318* (2015.01); *H04W 24/08* (2013.01)

(58) Field of Classification Search
CPC ..... H04W 24/00; H04W 84/12; H04W 88/08; H04W 80/04; H04W 88/06; H04W 84/18;
(Continued)

(56) References Cited

U.S. PATENT DOCUMENTS

| | | | |
|---|---|---|---|
| 5,924,040 A * | 7/1999 | Trompower | H04W 64/00 455/456.2 |
| 7,345,630 B2 * | 3/2008 | Tamaki | G01S 5/0252 342/457 |

(Continued)

FOREIGN PATENT DOCUMENTS

| | | |
|---|---|---|
| KR | 10-2002-0053401 A | 7/2002 |
| KR | 10-2006-0063545 A | 6/2006 |

(Continued)

OTHER PUBLICATIONS

Gati, A., et al., "Exposure induced by WCDMA mobiles phones in operating networks," IEEE Transactions on Wireless Communications, vol. 8.12, 2009 (pp. 5723-5727).

*Primary Examiner* — Brenda H Pham
(74) *Attorney, Agent, or Firm* — NSIP Law

(57) ABSTRACT

A device for controlling exposure of electromagnetic waves from a base station collects a power value received from at least one base station together with position information using a plurality of terminals in a controlled area; maps the received power value collected from the terminals on a plurality of subareas in the controlled area based on position information collected from the terminals; calculates a power density for respective frequency bandwidths in the respective subareas by using the received power value of the terminals provided in the respective subareas; and calculates a specific absorption rate of electromagnetic waves in a human body in the respective subareas by using a power density value for respective frequency bandwidths in the respective subareas.

17 Claims, 5 Drawing Sheets

(51) Int. Cl.
*H04B 1/3827* (2015.01)
*H04W 24/08* (2009.01)
*H04B 17/27* (2015.01)
*H04B 17/318* (2015.01)

(58) Field of Classification Search
CPC ..... H04L 43/50; H04L 43/0852; H04L 43/08; H04L 2012/5608; H04B 17/003
USPC .............................. 370/310.2, 252, 328, 338
See application file for complete search history.

(56) References Cited

U.S. PATENT DOCUMENTS

| | | | |
|---|---|---|---|
| 8,886,129 B2 | 11/2014 | Kim et al. | |
| 9,407,309 B2 * | 8/2016 | Lee | ..................... H04B 1/3838 |
| 2013/0226811 A1 | 8/2013 | Riise et al. | |
| 2014/0064252 A1 | 3/2014 | Lim et al. | |
| 2014/0176500 A1 | 6/2014 | Ludwig | |
| 2015/0188590 A1 | 7/2015 | Lee et al. | |
| 2016/0086484 A1 | 3/2016 | Feher | |
| 2016/0127087 A1 | 5/2016 | Feher | |
| 2016/0127165 A1 | 5/2016 | Feher | |

FOREIGN PATENT DOCUMENTS

| | | |
|---|---|---|
| KR | 10-2008-0031348 A | 4/2008 |
| KR | 10-2013-0056021 A | 5/2013 |
| KR | 10-2014-0017579 A | 2/2014 |
| KR | 10-2015-0060456 A | 6/2015 |

* cited by examiner

DEVICE AND METHOD FOR CONTROLLING EXPOSURE OF ELECTROMAGNETIC WAVES FROM BASE STATION

CROSS-REFERENCE TO RELATED APPLICATION

This application claims priority to and the benefit of Korean Patent Application Nos. 10-2015-0085343 and 10-2016-0050369 filed in the Korean Intellectual Property Office on Jun. 16, 2015 and Apr. 25, 2016, the entire contents of which are incorporated herein by reference.

BACKGROUND OF THE INVENTION (a) Field of the Invention

The present invention relates to a device and method for controlling exposure of electromagnetic waves from a base station.

(b) Description of the Related Art

At the present time, a downlink frequency of a mobile-communication base station is in the range of 800 MHz to 2 GHz, and one portable terminal uses a plurality of frequencies for communication with a base station because of the recent long term evolution (LTE) service.

An exposure degree of electromagnetic waves from the mobile-communication base station is lower than transmitted power of the portable terminal, but a user owning a portable terminal is exposed to the electromagnetic waves regardless of his intent so the exposure degree must not be neglected in comparison with an exposure amount of electromagnetic waves radiated from the portable terminal in the viewpoint of an accumulated amount of the electromagnetic waves. Further, in addition to the mobile-communication base station to which the portable terminal is connected, electromagnetic fields are simultaneously radiated from the base stations of networks of other service providers or the base stations of networks using voice communication and data transmission in a separate way. Therefore, the exposed user is being simultaneously exposed twenty-four hours to the radiated electromagnetic fields of many base stations.

A government-affiliated organization manually transports a portable antenna system (an antenna and a receiver) covering a radiation frequency of the actual base station to desired places and measures the electromagnetic waves in order to understand the real state of the exposure of electromagnetic waves from the base station. Such the method is very cumbersome and allows observation in a limited time and space. Further, the method may not catch an exposure situation in a building that is off-limits.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and device for controlling exposure of electromagnetic waves from a base station.

An exemplary embodiment of the present invention provides a method for a device for controlling exposure of electromagnetic waves from a base station to control exposure of electromagnetic waves. The method includes: collecting a power value received from at least one base station together with position information using a plurality of terminals in a controlled area; mapping the received power value collected from the plurality of terminals on a plurality of subareas in the controlled area based on position information collected from the plurality of terminals; calculating a power density for respective frequency bandwidths in the respective subareas by using the received power value of the plurality of terminals provided in the respective subareas; and calculating a specific absorption rate of electromagnetic waves in a human body in the respective subareas by using the power density for respective frequency bandwidths in the respective subareas.

The mapping may include converting the received power value collected using the plurality of terminals into a mean received power by time-averaging.

The calculating of a power density for respective frequency bandwidths in the respective subareas may include: classifying the received power value of the terminal provided in the corresponding subarea for respective frequency bandwidths in the plurality of subareas; calculating an entire received power for the frequency bandwidths in the plurality of subareas; and converting the entire received power for the respective frequency bandwidths into the power density in the plurality of subareas.

The calculating of a power density for respective frequency bandwidths in the respective subareas may further include converting the power density for respective frequency bandwidths into an electric field value in the plurality of subareas.

The classifying for respective frequency bandwidths may include: classifying the received power value of the terminals provided in the corresponding subarea for respective networks in the respective subareas; calculating the entire received power for respective networks in the respective subareas; and classifying the entire received power for respective networks by the frequency bandwidths in the respective subareas.

The method may further include distributing the power density for respective frequency bandwidths in the respective subareas to the controlled area in linkage with a geographic information system and visualizing the same.

The method may further include: comparing the power density for respective frequency bandwidths in the respective subareas and an electromagnetic wave human body protection standard and analyzing the same; and transmitting a comparison and analysis result to a terminal in the respective subareas.

The method may further include transmitting the specific absorption rate of electromagnetic waves in a human body in the respective subareas to a terminal in the respective subareas.

The calculating of a specific absorption rate of electromagnetic waves in a human body in the respective subareas may include: calculating an absorption rate of electromagnetic waves in a human body in the respective frequency bandwidths by using an absorption rate distribution of electromagnetic waves in the human body on a unit power density stored for respective frequency bandwidths and ages; and summing absorption rates of electromagnetic waves in the human body in the respective frequency bandwidths.

The absorption rate distribution of electromagnetic waves in the human body on the unit power density may be calculated in consideration of an incident direction of the electromagnetic waves, and a vertical polarization and a horizontal polarization of respective incident directions.

Another embodiment of the present invention provides a device for controlling exposure of electromagnetic waves from a base station. The device includes a data collector, a data processor, and a data provider. The data collector collects a power value received from at least one base station and position information using a plurality of terminals in a controlled area. The data processor calculates a power density for respective frequency bandwidths in respective subareas by using received power values of terminals provided in a plurality of subareas in the controlled area, and calculates a specific absorption rate of electromagnetic waves in a human body in the respective subareas by using the power density for respective frequency bandwidths in the respective subareas. The data provider transmits the specific absorption rate of electromagnetic waves in the human body in the respective subareas to terminals in the respective subareas.

The data processor may map the received power value collected using the plurality of terminals on the respective subareas based on position information collected from the plurality of terminals, may classify the received power value of the corresponding terminal in the respective subareas by frequency bandwidths, and may convert the entire received power for respective frequency bandwidths into a power density.

The data processor may sum a mean received power on at least one channel operated in the respective frequency bandwidths to calculate an entire received power in the corresponding frequency bandwidth.

The data processor may convert the power density for respective frequency bandwidths in the respective subareas into an electric field value.

The data provider may distribute the power density for respective frequency bandwidths in the respective subareas to the controlled area, and may visualize the same in linkage with a geographic information system.

The data provider may compare the power density for respective frequency bandwidths in the respective subareas with an electromagnetic wave human body protection standard, may analyze the same, and may transmit a comparison and analysis result to the terminal in the respective subareas.

The data processor may calculate an absorption rate of electromagnetic waves in the human body in the respective frequency bandwidths by use for the respective subareas by using an absorption rate distribution of electromagnetic waves in the human body on a unit power density stored for respective frequency bandwidths and ages, and may sum the absorption rate of electromagnetic waves in the human body in the respective frequency bandwidth for the respective subareas.

The device may further include a data storage unit for storing an absorption rate distribution of electromagnetic waves of the human body on the unit power density for the respective frequency bandwidth and ages, wherein the absorption rate distribution of electromagnetic waves of the human body on the unit power density may be calculated by considering an incident direction of the electromagnetic waves, and a vertical polarization and a horizontal polarization of respective incident directions.

According to the exemplary embodiments of the present invention, real-time electromagnetic wave exposure information changeable with respect to time and place may be easily provided to the user who worries about health because of the electromagnetic waves.

Further, the user may know the characteristic of the exposure level of electromagnetic waves according to given situations to allow him to select the place where he uses the device, thereby providing an opportunity for him to suppress or prevent the exposure of electromagnetic waves.

Further, the changes of propagation levels on the respective networks operated by mobile communication service providers with respect to time may be sensed, which is applicable to designs and management of base station networks, and which allows immediate measures if necessary.

DETAILED DESCRIPTION OF THE EMBODIMENTS

Figure 1:
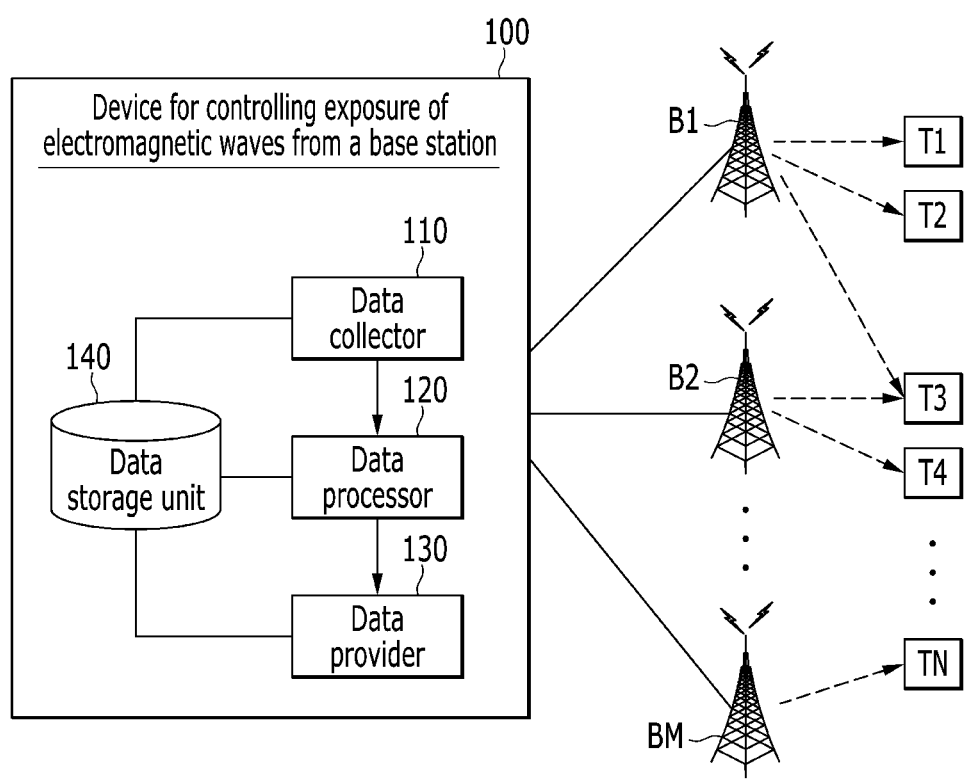
FIG. 1 shows a device for controlling exposure of electromagnetic waves from a base station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising" will be understood to imply the inclusion of stated elements but not the exclusion of any other elements.

Throughout the specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and it may include entire or partial functions of the MT, MS, AMS, HR-MS, SS, PSS, AT, and UE.

Further, a base station (BS) may designate an advanced base station (ABS), a high reliability base station (HR-BS), a nodeB (node B), an evolved node B (eNodeB), an access point (AP), a radio access station (RAS), a base transceiver station (BTS), a mobile multihop relay (MMR)-BS, a relay station (RS) for functioning as the base station, a relay node (RN) for functioning as the base station, an advanced relay station (ARS) for functioning as the base station, a high reliability relay station (HR-RS) for functioning as the base station, or a small base station (such as a femto BS, a home node B (HNB), a home eNodeB (HeNB), a pico BS, a metro BS, or a micro BS), and it may include entire or partial functions of the ABS, nodeB, eNodeB, AP, RAS, BTS, MMR-BS, RS, RN, ARS, HR-RS, and small base station.

A method and device for controlling exposure of electromagnetic waves from a base station according to an exemplary embodiment of the present invention will now be described with reference to accompanying drawings.

Figure 2:
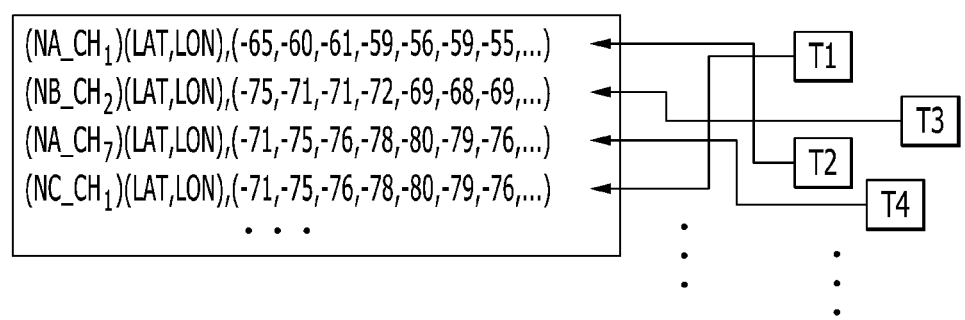
FIG. 2 shows data collected by a data collector according to an exemplary embodiment of the present invention.

FIG. 1 shows a device for controlling exposure of electromagnetic waves from a base station according to an exemplary embodiment of the present invention, and FIG. 2 shows data collected by a data collector according to an exemplary embodiment of the present invention.

Referring to FIG. 1, the device 100 for controlling exposure of electromagnetic waves from a base station includes a data collector 110, a data processor 120, a data provider 130, and a data storage unit 140. The data collector 110, the data processor 120, and the data provider 130 may be realized with a central processing unit (CPU), another chipset, or a microprocessor. Further, the functions of the data collector 110, the data processor 120, the data provider 130, and the data storage unit 140 may be performed by instructions of the CPU, the other chipset, or the microprocessor.

The data collector 110 collects data from terminals (T1, T2, . . . , TN) in a controlled area in a plurality of networks through the base stations (B1, B2, . . . , BM). The data collector 110 may receive data from the base stations (B1, B2, . . . , BM) in the controlled area according to a predetermined sampling frequency. The sampling frequency may be set to be one second.

The terminals (T1, T2, . . . , TN) represent terminals that are turned on to be in a standby state or be operated in a plurality of networks in the controlled area, and measure received power (Rx power) from the signals transmitted by at least one base station (B1, B2, . . . , BM). The base stations (B1, B2, . . . , BM) may transmit signals with predetermined transmitted power so that the terminals (T1, T2, . . . , TN) may measure the received power (Rx power). In this instance, a used amount of data is increased when the data are transmitted with a predetermined time (for example, for each unit of seconds) so the terminals (T1, T2, . . . , TN) may transmit data with a long period (for example, at regular intervals of ten seconds) when there is no movement of places.

As shown in FIG. 2, the data collected from the terminals (T1, T2, . . . , TN) in the controlled area may include network names (NA, NB, NC, . . . ), channel numbers ($CH_1$, $CH_2$, . . . ), a latitude and a longitude (LAT and LON) for indicating position information, and string data of received power (Rx power). For example, "[NA_$CH_1$],[LAT,LON],[−65,−60,−61,−59,−56,−59,−55, . . . ]" represents received power values (−65,−60,−61,−59,−56,−59,−55, . . . ) for the terminal T1 to receive the transmitted power on a channel $CH_1$ of the network A at the interval of one second at the position of (LAT,LON), and the received power value may use the dBm unit. The data collected in this manner may be stored in the data storage unit 140.

Referring to FIG. 1, the data processor 120 processes the data collected from the terminals (T1, T2, . . . , TN) in the controlled area to calculate an exposed amount of electromagnetic waves, and processes the exposed amount of electromagnetic waves so as to provide the same to the terminal of the corresponding user.

The data provider 130 provides the processed exposed amount of electromagnetic waves to the terminal of the corresponding user through the corresponding base station.

The data storage unit 140 stores map data and stores a three-dimensional distribution of a specific absorption rate (SAR) of electromagnetic waves in a human body when a power density of 1 $W/m^2$ is input into the corresponding human body. The data storage unit 140 may store the three-dimensional distribution of the SAR in the human body for respective frequencies (about 800/900 MHz, 1800 MHz, 2100 MHz, and 2600 MHz bands) and ages (infants, children, and adults). Further, the data storage unit 140 may store the data collected from the terminals (T1, T2, . . . , TN) in the controlled area.

Figure 3:
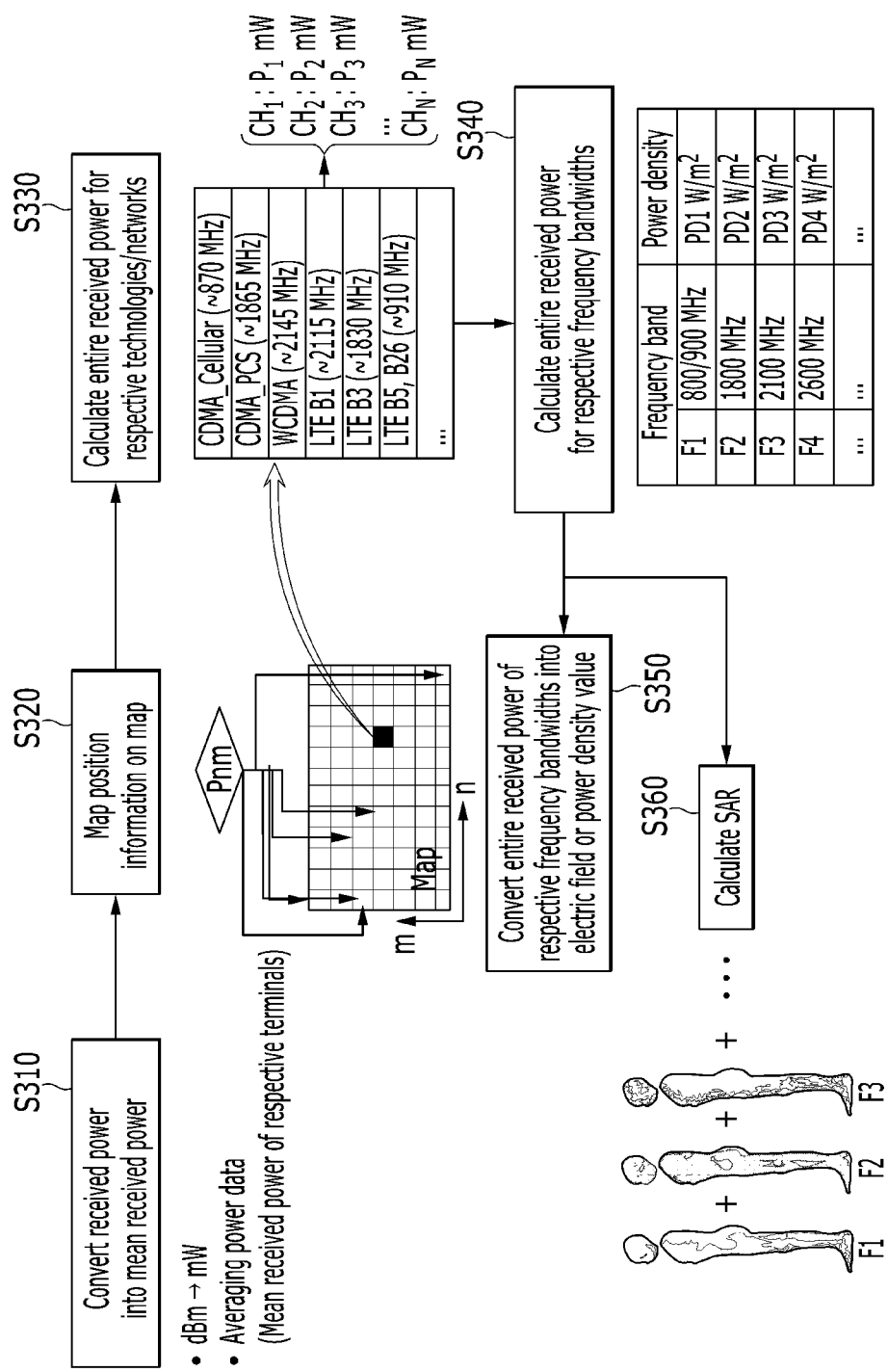
FIG. 3 shows a flowchart of a method for a data processor shown in FIG. 1 to process data.

FIG. 3 shows a flowchart of a method for a data processor shown in FIG. 1 to process data.

Referring to FIG. 3, the data processor 120 time-averages the received power provided by the respective terminals (T1, T2, . . . , TN) to convert the same into mean received power (S310). For example, the data processor 120 collects the received power values (−65,−60,−61,−59,−56,−59, −55, . . . ) that are received at the interval of one second to calculate a mean received power value for ten seconds. In this instance, the data processor 120 may calculate the mean received power value with the conversion into W (or mW) when the unit of the received power value is dBm.

The data processor 120 maps position information of the respective terminals (T1, T2, . . . , TN) from among the data collected from the terminals (T1, T2, . . . , TN) on the map (S320). The data processor 120 divides the map of the controlled area into subareas and denotes a position of one subarea as Pnm, and a gap between the subareas may be controlled. For example, assuming that the controlled area is divided into subareas with a gap of 20 m, the data of the terminals that are provided inside the 20 m×20 m square at the position Pnm in the subarea are considered to be the data at the same point.

The data processor 120 classifies the data collected from the position Pnm for respective mobile communication technologies/networks, and calculates entire received power for the respective mobile communication technologies/networks (S330). For example, a network of a service provider OA operates six channels ($CH_1$, $CH_2$, . . . , $CH_6$) for a WCDMA service at the position Pnm, and a network of a service provider OB operates four channels ($CH_7$, $CH_8$, $CH_9$, and $CH_{10}$) in an adjacent frequency bandwidth. It will be assumed that mean received power values for the respective channels ($CH_1$, $CH_2$, . . . , $CH_{10}$) are $CH_1=P_1$ mW, $CH_2=P_2$ mW, . . . , $CH_{10}=P_{10}$ mW. In this case, the entire received power $P_r$ of the WCDMA network at the position Pnm becomes $P_1+P_2+ . . . +P_{10}$ (mW). Here, when data of a plurality of terminals are provided for an identical channel, the data processor 120 may average the received power of the terminals to calculate a mean received power value of the corresponding channel, and it may use a mean power value of another channel of the same network regarding received power of an unobtainable channel.

The data processor 120 classifies entire received power for respective mobile communication technologies/networks by frequency bandwidths, and calculates the entire received power for respective frequency bandwidths (S340). Similar frequency bandwidths have similar energy distributions of electromagnetic waves absorbed in the human body at the same level, so the data processor 120 may classify the similar frequency bandwidths as one frequency bandwidth. For example, the frequency bandwidth of the CDMA cellular system and the frequency bandwidths of the LTE band 5 and the LTE band 26 are 800-900 MHz, so the data processor 120 may classify the same as the frequency F1 and may add received powers thereof to calculate the entire received power of the frequency F1. Further, the frequency bandwidth of the CDMA PCS and the frequency bandwidth of the LTE band 3 may be considered to be adjacent frequency bandwidths so the frequency bandwidths of the CDMA PCS and the LTE band 3 may be classified as the frequency F2, and received powers of the CDMA PCS and the LTE band 3 may be added to calculate the entire received power of the frequency F2. The frequency bandwidth of the WCDMA and the frequency bandwidth of the LTE band 1 may be considered to be adjacent frequency bandwidths so the frequency bandwidths of the WCDMA and the LTE band 1 may be classified as the frequency F3, and the received powers of the WCDMA and the LTE band 1 may be added to calculate the entire received power of the frequency F3.

The data processor 120 converts the entire received power of the respective frequency bandwidths into an electric field or power density value (S350). When the mean received power of the frequency bandwidth F3 at the position Pnm is set to be $P_{r\_F3}$, $P_{r\_F3}$ represents a mean received power that is received in the frequency bandwidth of about 2100 MHz at the position Pnm. This represents a value for the base stations at the position Pnm and not a single channel, and also indicates a value that is attenuated by a distance from the base station, a building, a terrain feature, a vehicle, or a human body.

An intensity of the electromagnetic field that is input to the human body must be known in order to predict the level of electromagnetic waves exposed to the human body from the respective base stations at the position Pnm. When the power density of the input electromagnetic waves is defined to be power density (PD), a received power value $P_r$ is found by an effective aperture ($A_{eff}$) of the receiving antenna as expressed in Equation 1.

$$P_r = PD \cdot A_{eff} \qquad \text{(Equation 1)}$$

A degree for the terminal to receive the waves becomes different because of the existence of the human body. Therefore, the effective aperture $A_{eff}$ of the receiving antenna may be determined as expressed in Equation 2 by assuming the terminal and the human body as a receiving antenna.

$$A_{eff} = \frac{\lambda^2}{4\pi} G \qquad \text{(Equation 2)}$$

In Equation 2, G represents an antenna gain, and a gain of the receiving antenna including a human body in the mobile communication frequency bandwidth is considered to be between −6 dB (800-900 MHz) and −9 dB (WCDMA band). λ represents a center frequency wavelength (unit: m) of the frequency bandwidth to be found.

Therefore, the received power density PD to be found according to an exemplary embodiment of the present invention may be expressed as in Equation 3. Here, when the unit of the received power is mW, the unit of the received power density PD may be mW/m².

$$PD = \frac{4\pi}{\lambda^2 G} \cdot P_r \qquad \text{(Equation 3)}$$

At the present time, a human body protection standard defines an SAR, an electric field, a magnetic field, and a power density limit value in the mobile communication frequency bandwidth. In the case of the exposure of electromagnetic waves from the base station, the human body is generally positioned in a far-field zone. Therefore, the received power density (PD) value may be converted into an electric field value by use of Equation 4.

$$E = PD/H = \sqrt{377 \cdot PD} \qquad \text{(Equation 4)}$$

In Equation 4, H is an intensity of the magnetic field (unit: A/m) at the same position.

Further, the data processor 120 calculates an electric field or power density value of the respective frequency bandwidths at the respective positions and calculates the SAR in the human body (S360).

When a three-dimensional SAR distribution on a five-year-old human body is set to be $SAR_{5y\_1}$ when the unit power density 1 W/m² is input to the human body in the frequency bandwidth of 800 to 900 MHz, the SAR distribution $SAR_{5y\_PD1}$ of the same human body for a power density PD1 (W/m²) may be calculated by multiplying the $SAR_{5y\_1}$ by the power density PD1 (W/m²) as expressed in Equation 5. The SAR value may be calculated by using Equation 5 irrespective of the mean value of the whole body, a specific organ, or a specific body part.

$$SAR_{5y\_PD1}(W/kg) = \frac{PD1(W/m^2)}{1(W/m^2)} \times SAR_{5y\_1}(W/kg) \qquad \text{(Equation 5)}$$

For example, when a 1 g peak SAR value of the head of the five-year-old model is X (W/kg) when the unit power density 1 W/m² is input into the human body, the SAR distribution of the same part for the PD1 W/m² becomes PD1·X (W/kg).

The total SAR in the five-year-old human body at the position Pnm because of the electromagnetic waves radiated from nearby base stations may be expressed as in Equation 6.

$$SAR_{5y\_PD}(W/kg) = SAR_{5y\_PD1} + SAR_{5y\_PD2} + \ldots + SAR_{5y\_PDM} \qquad \text{(Equation 6)}$$

In Equation 6, M signifies a total number of frequency bandwidths at the position Pnm.

When the electric field or power density values of the respective frequency bandwidth at the respective positions are calculated by the data processor 120, the data provider 130 processes the data and provides the same to the terminals (T1, T2, . . . , TN) through the mobile communication network. For example, the data provider 130 may distribute the electric field or power density values for the frequency bandwidths to the controlled area, and may visualize the same according to an owned linkage with such as a geographic information system (GIS) based on the electric field or power density values of the frequency bandwidths at the respective positions. Further, the data provider 130 may compare the electric field or power density values of the frequency bandwidths at the respective positions and the electromagnetic wave human body protection standard, may analyze the same, and may provide an analysis result to the terminals (T1, T2, . . . , TN) through the mobile communication network, and it may process various kinds of information on the SAR calculated through Equation 5 and Equation 6 into an easy form and may provide the same to the terminals (T1, T2, . . . , TN) through the mobile communication network.

Further, the data provided by the data provider 130 may be applied to design and management of the base station network, management of electromagnetic waves to the human body, and a study of investigation of dynamics of a risk communication and wireless communication environment.

Figure 4:
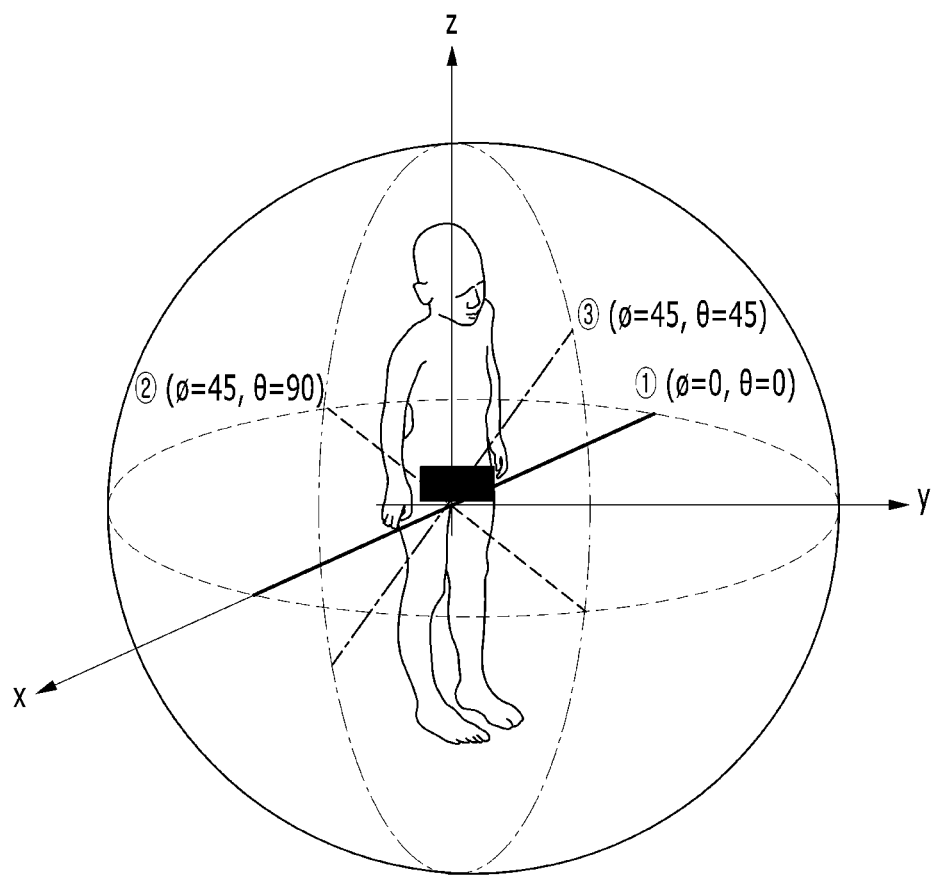
FIG. 4 shows a coordinate system for indicating an incident direction of electromagnetic waves according to an exemplary embodiment of the present invention.
Figure 5:
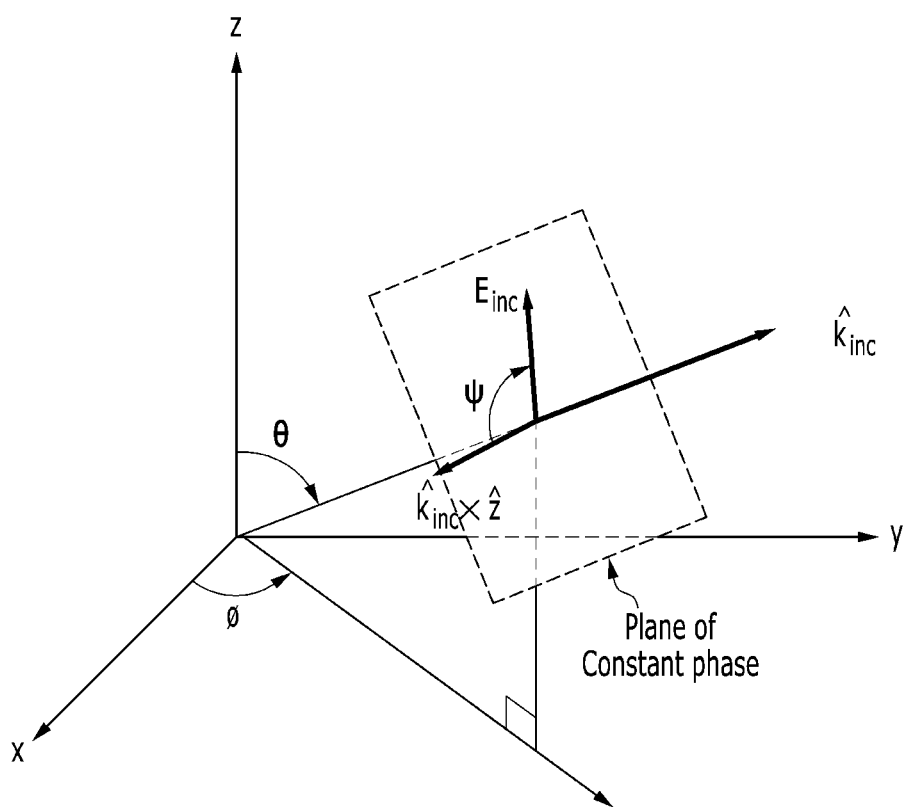
FIG. 5 shows definition of $\phi$, $\theta$, and $\psi$ expressed in Table 1.

FIG. 4 shows a coordinate system for indicating an incident direction of electromagnetic waves according to an exemplary embodiment of the present invention, and FIG. 5 shows definition of ϕ, θ, and ψ expressed in Table 1.

In general, in order to find a maximum value of the mean SAR of the whole body, the electromagnetic wave in one direction that is input from a front of the human body and vertical polarization are considered. However, the electromagnetic waves irradiated from a plurality of base stations are reflected and diffracted during a propagation process so there are a plurality of directions of electromagnetic waves, and a further accurate SAR may be calculated when horizontal polarization is considered in addition to the polarization or the vertical polarization.

Table 1 expresses directions of electromagnetic waves that are input for each 90 degrees.

TABLE 1

|  | θ (degrees) | ϕ (degrees) | ψ (degrees) |
|---|---|---|---|
| 1 | 0 | 0 | 0 |
| 2 | 0 | 0 | 90 |
| 3 | 90 | 0 | 0 |
| 4 | 90 | 0 | 90 |
| 5 | 90 | 90 | 0 |
| 6 | 90 | 90 | 90 |
| 7 | 90 | 180 | 0 |
| 8 | 90 | 180 | 90 |
| 9 | 90 | 270 | 0 |
| 10 | 90 | 270 | 90 |
| 11 | 180 | 0 | 0 |
| 12 | 180 | 0 | 90 |

As shown in FIG. 4, when the electromagnetic waves are input for the respective 90 degrees, there are six directions of electromagnetic waves, and when the vertical polarization and the horizontal polarization are considered for the respective directions, there are a total of twelve plane waves. In Table 1, ϕ and θ may determine an incident direction of the plane wave, ψ may determine polarization of the electromagnetic waves, and ϕ, θ, and ψ may be defined as shown in FIG. 5. In FIG. 5, $E_{inc}$ represents an incident electric field vector, and $\hat{k}_{inc}$ indicates an incident direction. The incident direction is to orthogonal to the electric field direction according to an electromagnetic characteristic. An angle ψ is formed between the $\hat{k}_{inc} \times \hat{z}$ (i.e., a cross product of an incident direction and a z direction) and the incident electric field, and ψ is used to define the incident electric field.

The device 100 for controlling exposure of electromagnetic waves from a base station may calculate the SAR distribution of the human body regarding the inputting of the unit power density of 1 W/m² of the respective plane waves in one frequency, may calculate a mean value of the SAR distribution calculated for the inputting of the unit power density of 1 W/m² of the respective plane waves, and may use the mean value as the SAR distribution in the human body for the base station using the corresponding frequency. When the used human body model is five years old, $SAR_{5y\_1}$ W/kg in Equation 5 represents a mean value of the SAR distribution calculated for the inputting of the unit power density 1 W/m² of the twelve plane waves.

In this instance, in order to calculate a more accurate value as the frequency becomes larger, the device 100 for controlling exposure of electromagnetic waves from a base station may consider the plane wave that is input at a narrower angle (e.g., 60 degrees or 45 degrees) than the 90 degrees, and may consider a further number of plane waves so as to calculate the SAR distribution for the unit power density of 1 W/m².

Further, the device 100 for controlling exposure of electromagnetic waves from a base station may store detailed SAR distributions for respective ages and poses in the data storage unit 140, and may store detailed SAR distribution values for respective organs in the data storage unit 140 in addition to the mean value of the SAR distribution of the whole body.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a device for controlling exposure of electromagnetic waves from a base station to control exposure of electromagnetic waves, comprising:
   collecting a power value received from at least one base station together with position information using terminals in a controlled area;
   mapping the received power value collected from the terminals on subareas in the controlled area based on position information collected from the terminals;
   calculating a power density for respective frequency bandwidths in the respective subareas by using the received power value of the terminals provided in the respective subareas;
   calculating a specific absorption rate of electromagnetic waves in a human body in the respective subareas by using the power density for respective frequency bandwidths in the respective subareas; and
   transmitting the specific absorption rate of electromagnetic waves in a human body in the respective subareas to a terminal in the respective subareas.

2. The method of claim 1, wherein the mapping comprises converting the received power value collected using the terminals into a mean received power by time-averaging.

3. The method of claim 1, wherein the calculating of a power density for respective frequency bandwidths in the respective subareas comprises:
   classifying the received power value of the terminals provided in the corresponding subarea for respective frequency bandwidths in the subareas;
   calculating an entire received power for the frequency bandwidths in the subareas; and
   converting the entire received power for the respective frequency bandwidths into the power density in the subareas.

4. The method of claim 3, wherein the calculating of a power density for respective frequency bandwidths in the respective subareas further comprises converting the power density for respective frequency bandwidths into an electric field value in the subareas.

5. The method of claim 3, wherein the classifying for respective frequency bandwidths comprises:
   classifying the received power value of the terminals provided in the corresponding subarea for respective networks in the respective subareas;
   calculating the entire received power for respective networks in the respective subareas; and classifying the entire received power for respective networks by the frequency bandwidths in the respective subareas.

6. The method of claim 1, further comprising:
distributing the power density for respective frequency bandwidths in the respective subareas to the controlled area in linkage with a geographic information system and visualizing the same.

7. The method of claim 1, further comprising:
comparing the power density for respective frequency bandwidths in the respective subareas and an electromagnetic wave human body protection standard and analyzing the same; and
transmitting a comparison and analysis result to a terminal in the respective subareas.

8. The method of claim 1, wherein the calculating of a specific absorption rate of electromagnetic waves in a human body in the respective subareas comprises:
calculating an absorption rate of electromagnetic waves in a human body in the respective frequency bandwidths by using an absorption rate distribution of electromagnetic waves in the human body on a unit power density stored for respective frequency bandwidths and ages; and
summing absorption rates of electromagnetic waves in the human body in the respective frequency bandwidths.

9. The method of claim 8, wherein the absorption rate distribution of electromagnetic waves in the human body on the unit power density is calculated in consideration of an incident direction of the electromagnetic waves, and a vertical polarization and a horizontal polarization of respective incident directions.

10. A device for controlling exposure of electromagnetic waves from a base station comprising:
a data collector configured to collect a power value received from at least one base station and position information using terminals in a controlled area;
a data processor configured to calculate a power density for respective frequency bandwidths in respective subareas by using received power values of terminals provided in subareas in the controlled area, and calculating a specific absorption rate of electromagnetic waves in a human body in the respective subareas by using the power density value for respective frequency bandwidths in the respective subareas; and
a data provider configured to transmit the specific absorption rate of electromagnetic waves in the human body in the respective subareas to terminals in the respective subareas.

11. The device of claim 10, wherein the data processor is further configured to map the received power value collected using the terminals on the respective subareas based on position information collected from the terminals, classifies the received power value of the corresponding terminal in the respective subareas by frequency bandwidths, and convert the entire received power for respective frequency bandwidths into a power density.

12. The device of claim 11, wherein the data processor is further configured to sum a mean received power on at least one channel operated in the respective frequency bandwidths to calculate an entire received power in the corresponding frequency bandwidth.

13. The device of claim 10, wherein the data processor is further configured to convert the power density for respective frequency bandwidths in the respective subareas into an electric field value.

14. The device of claim 10, wherein the data provider is further configured to distribute the power density for respective frequency bandwidths in the respective subareas to the controlled area and visualize the same in linkage with a geographic information system.

15. The device of claim 10, wherein the data provider is further configured to compare the power density for respective frequency bandwidths in the respective subareas with an electromagnetic wave human body protection standard, analyze the same, and transmit a comparison and analysis result to the terminal in the respective subareas.

16. The device of claim 10, wherein the data processor is further configured to calculate an absorption rate of electromagnetic waves in the human body in the respective frequency bandwidths by using for the respective subareas by using an absorption rate distribution of electromagnetic waves in the human body on a unit power density stored for respective frequency bandwidths and ages, and sum the absorption rate of electromagnetic waves in the human body in the respective frequency bandwidth for the respective subareas.

17. The device of claim 16, further comprising:
a data storage unit configured to store an absorption rate distribution of electromagnetic waves of the human body on the unit power density for the respective frequency bandwidth and ages,
wherein the absorption rate distribution of electromagnetic waves of the human body on the unit power density is calculated by considering an incident direction of the electromagnetic waves, and a vertical polarization and a horizontal polarization of respective incident directions.

* * * * *